United States Patent [19]

Komai et al.

[11] Patent Number: 5,080,159

[45] Date of Patent: Jan. 14, 1992

[54] HIGHLY DURABLE PNEUMATIC RADIAL TIRE HAVING ADHESIVE TREATED CARCASS CORDS

[75] Inventors: Yukio Komai, Shiga; Kietsu Maeda, Osaka, both of Japan

[73] Assignee: Toyo Tire & Rubber Co., Ltd., Osaka, Japan

[21] Appl. No.: 458,260

[22] Filed: Dec. 28, 1989

Related U.S. Application Data

[63] Continuation-in-part of Ser. No. 102,638, Sep. 30, 1987, abandoned.

[30] Foreign Application Priority Data

Sep. 30, 1986 [JP] Japan ................................ 61-233840

[51] Int. Cl.$^5$ .............................................. B60C 9/08
[52] U.S. Cl. ...................... 152/556; 57/242; 57/902; 152/565; 156/910
[58] Field of Search ............... 152/451, 565, 527, 548, 152/556, 564; 156/910; 57/902, 241, 242, 297

[56] References Cited

U.S. PATENT DOCUMENTS

| | | | |
|---|---|---|---|
| 4,652,488 | 3/1987 | Willemsen et al. | 57/242 X |
| 4,657,058 | 4/1987 | Kabe et al. | 152/556 |
| 4,787,200 | 11/1988 | Inada et al. | 57/242 |
| 4,793,131 | 12/1988 | Mizuno et al. | 152/451 |

*Primary Examiner*—Geoffrey L. Knable
*Attorney, Agent, or Firm*—Wenderoth, Lind & Ponack

[57] ABSTRACT

A pneumatic radial tire including at least one ply of carcass layer comprising a number of cords disposed at right angle with respect to a circumferential direction of the tire and anchored at a pair of beads, said cords of the carcass layer being treated with adhesive treating agents, i.e. an epoxy treating agent and a RFL treating agent, at the stage of both yarns and cords, said cords being formed by twisting at least two treated strands which are formed by twisting yarns treated with both the epoxy treating agent and the RFL treating agent and said cords being further treated with at least the RFL treating agent.

1 Claim, No Drawings

HIGHLY DURABLE PNEUMATIC RADIAL TIRE HAVING ADHESIVE TREATED CARCASS CORDS

This is a continuation-in-part of Ser. No. 07/102,638, filed Sept. 30, 1987, now abandoned.

BACKGROUND OF THE INVENTION

1. Field of the Invention

The present invention relates to a pneumatic radial tire including at least one ply of carcass layer comprising a number of cords disposed at right angles with respect to the circumferential direction of the tire and anchored at a pair of beads, and more particularly to a highly durable pneumatic radial tire, especially a highly durable radial tire adapted for use on a large and heavy vehicle, the durability of which is greatly enhanced by an improvement in the treatment of carcass cords.

2. Prior Art

A carcass layer which is one of the important constituents for a pneumatic radial tire is composed of carcass cords and a covering rubber coated thereon. Polyester cords are often used for carcass materials.

The strength of polyester cords, however, is 5 to 7 g/d and of comparatively low strength. Accordingly, a pneumatic tire used for a large heavy vehicle has to include at least two or more plies of carcass layer. As a result, a carcass layer becomes thicker and causes a higher heat build-up which results in deterioration of the durability of a pneumatic tire.

On the other hand, steel cords having comparatively high strength, one ply of carcass layer may be applicable. However, a reduction of tire weight is impaired. Besides, the steel cords being so corrosive, reduction of strength is apt to be caused.

Recently proposals have been made to use aromatic polyamide fiber cords of much higher strength than polyester cords. One ply of a carcass layer will do so that both a reduction of tire weight and an improvement of durability are attained together.

Aromatic polyamide fiber cords, however, are rather inferior in adherence to a covering rubber as compared with polyester cords and steel cords for the reason of the molecular structure of aromatic polyamide. Then there is an anxiety that a separation trouble occurs between carcass cords and a covering rubber.

Moreover, a turn-up end of a carcass layer turned up around a bead exposes a cut face of cords which is free from adhesives so that a turn-up separation from a covering rubber or a surrounding rubber occurs at an early stage and the durability of tire is much impaired.

SUMMARY OF THE INVENTION

In view of the above, it is the object of the present invention to provide a carcass structure wherein separation trouble is eliminated and a turn-up separation at the turn-up end of cords is restricted in occurence despite the fact that a cord material of inferior adherence to a covering rubber is employed for a carcass layer.

Consecutive research for solving the problems reveals the following.

Namely, when the cords of 0.8 mm or more in diameter are used for a carcass layer, a degree of penetration of adhesives between fiber filaments of the cords and the amount of adhesives surrounding the cords have a great relation to separation caused by stress concentration in the vicinity of a turn-up end of a carcass layer. With the increase of a diameter of a cord, the stress concentration at the vicinity of a turn-up end of a carcass cord increases more and more. Accordingly, when the penetration of adhesives between fiber filaments of the cords and the amount of adhesives surrounding the surface of the cords are insufficient, a separation failure occurs in a short period of time.

In accordance with the present invention, a separation failure and a turn-up separation of the turn-up portion are fully restricted in occurence and tire durability is greatly improved by developing a cord treatment which enables sufficient penetration of adhesives between fiber filaments.

Carcass cords in the present invention are as follows.

A number of filaments are bundled to form a yarn without executing actual twisting. Said yarns are treated by an adhesive agent and dried and thereafter twisted to form treated strands. At least two treated strands are twisted together to form a cord. Said cords are further treated by adhesives agent. Namely, the carcass cords employed in accordance with the present invention are subjected to two-step adhesive treatment.

In other words, first a yarn is subjected to adhesive treatment and further a cord is also subjected to adhesive treatment. Said two-step adhesive treatment enables sufficient penetration and impregnation of adhesives between fiber filaments of cords and much improves anti-separation adhesion between treated filaments and a covering rubber.

Said adhesive treatment is conducted by an epoxy treating agent mainly comprising polyepoxide compounds and a RFL treating agent mainly comprising resorcin-formalin-latex. More precisely, a yarn is subjected to a treatment by an epoxy treating agent mainly comprising polyepoxide compounds or subjected to a double treatment by using both an epoxy treating agent and a RFL treating agent mainly comprising resorcin-formalin-latex before conducting a first twist of said yarn. Then the yarns thus treated are dried at a high temperature. After twisting the treated yarns to form a treated strand, at least two treated strands are twisted together to form a cord. Then a cord is subjected to a double adhesive treatment by an epoxy treating agent and a RFL treating agent whereby a carcass cord in accordance with the present invention is obtained. A double treatment is especially required for an aromatic polyamide fiber cord so as to improve anti-separation adhesion. Because an aromatic polyamide has a micro structure wherein a crystal region develops while a non-crystal region decreases, then it is required that a surface area shall be activated by polyepoxide compounds.

The number of twists is preferably decided so that a value of coefficient of twist shall be 600 to 1500 for the first twist to form a strand and 1000 to 2000 for the final twist to form a cord in accordance with the following equation.

$$K = T\sqrt{D/\rho}$$

wherein,
K: coefficient of twist
T: number of twist (turns/10 cm)
D: nominal denier
$\rho$: density (g/cm$^3$)

In case the coefficient of twist is smaller than the preferred range mentioned above, fatigue resistance of the cord becomes poor. On the contrary, in case the coefficient of twist is greater than the preferred range, the cord exhibits large extension under a load and thereby tire rigidity deteriorates.

Said coefficient of twist for the first twist is preferably 1.3 to 1.8 times greater than the coefficient of twist for the second twist. Otherwise a twist structure of cord is unstable.

An epoxy treating agent mainly comprises polyepoxide compounds, that is, it may be polyepoxide compounds alone or a mixture of polyepoxide compounds and blocked isocyanate.

Polyepoxide compounds are preferably compounds having at least more than two epoxy groups per molecule, such as glycidyl ether compounds of polyhydroxy alcohol, which are obtained by a reaction of polyhydroxy alcohol such as ethylene glycol, glycerol, sorbitol, etc. and epoxide including halogen such as epichlorhydrin, for example, 3,4-epoxy cyclohexane epoxide, 3,4-epoxy cyclohexyl methyl-3,4-epoxy cyclohexane carboxylate, bis(3,4-epoxy-6-methyl-cyclohexyl methyl)adipate.

Blocked isocyanate to be mixed with polyepoxide compounds may be prepared from aromatic polyisocyanate such as diphenylmethane diisocyanate, polymethylene polyphenyl isocyanate, etc. with a blocking agent such as phenol, imide, lactam and so forth.

A RFL treating agent mainly comprises resorcin-formalin-latex, that is, it may be a mixture of a primary condensate of resorcin-formalin and vinylpyridine styrene butadiene terpolymer-latex, stylene-butadiene copolymer-latex etc. Non volatile content in epoxy treating agent is preferably 10–20% in weight and RFL treating agent is preferably 15–20%.

The present invention is preferably adapted to an aromatic polyamide fiber, but is also applicable to any other cord materials such as polyester, nylon, aromatic polyester, vinylon(polyvinyl alcohol), rayon fiber.

Carcass cords in accordance with the present invention are thus prepared after a two-step adhesive treatment by using an epoxy treating agent mainly comprising polyepoxide compounds or by using both an epoxy treating agent and a RFL treating agent mainly comprising resorcin-formalin-latex at the stage of a yarn and by using both an epoxy and RFL treating agent at the stage of a cord, and thereby adhesives penetrate between the fiber filaments of the carcass cords and cover the face of the cord so that turn-up separation at the turn-up portion and separation at other portion are greatly reduced. As a result, tire durability is much improved.

Further, there being no need to pay an attention to turn-up height, that is, the height from a bead to turn-up end of a carcass layer which has a close relation to the turn-up separation, a carcass structure can be easily devised.

In addition, large diameter cord being usable without causing turn-up separation and other separation, a reduced number of ply is employable so that tire weight can be reduced.

DETAILED DESCRIPTION OF THE INVENTION

An aromatic aramid fiber of 3000 denier in the denier of a yarn was used for one embodiment. A number of filaments were separated from each other in bundle without actual twist as a yarn. Said yarn was subjected to an epoxy and RFL treatment by using a treating apparatus adapted for an individual heat treatment. Namely, the yarns were dipped in the epoxy treating agent in a bath and dried. Consecutively thereafter, the yarns were dipped in the RFL treating agent in a bath and dried well. The yarns were then twisted by a twister at a coefficient of twist (K) of 913 to form treated strands. Three treated strands were then twisted at a coefficient of twist (K) of 1580 to form cords of 1.3 mm diameter.

750 ends of the cords were arranged in parallel with each other and wefts were interwoven to form a cord fabric. By using a treating apparatus adapted for heat treatment of a cord fabric, said cord fabric was dipped in the epoxy treating agent in a bath and dried. Consecutively thereafter, the cord fabric was dipped in the RFL treating agent in a bath and dried well. Thus the treated cord fabric was obtained.

A radial tire of 1000R20 14PR having one ply of carcass layer made of the treated cord fabric is manufactured for testing.

Table 1 and Table 2 show the results of tests conducted under different conditions using the epoxy treating agent and the RFL treating agent.

In the tables, Embodiment 1 is a tire using the treated cord fabric in accordance with the above steps.

Embodiment 2 is a tire manufactured in accordance with the same steps in Embodiment 1 with the exception that the yarn is treated with the epoxy treating agent and the cords in the form of cord fabric are subjected to a double treatment by the epoxy treating agent and the RFL treating agent. Embodiment 3 is a tire manufactured in accordance with the same steps in Embodiment 1 with the exception that the cord is only treated with the RFL treating agent.

Comparison tires 1 to 4 are the same with the embodiments in the cord material, number of twist etc. but are different from them in adhesive treatment as shown in Table 1. Comparison tire 3 is the same with the Embodiment 1 with the exception that both the yarn and the cord are treated only by the RFL treating agent. Comparison tire 4 is the same with the Embodiment 1 with the exception that the cord is not subjected to any adhesive treatment although the yarn is treated with both agents as in the Embodiment 1.

TABLE 1

| treating agent | before cord adhesive treatment | | cord adhesive treatment | |
|---|---|---|---|---|
| | epoxy | RFL | epoxy | RFL |
| Embodiment 1 | yarn | epoxy treated yarn | cord | epoxy treated cord |
| Embodiment 2 | yarn | — | cord | epoxy treated cord |
| Embodiment 3 | yarn | epoxy treated yarn | — | cord |
| Comparison 1 | — | — | cord | epoxy treated cord |
| Comparison 2 | strand | epoxy treated strand | cord | epoxy treated cord |
| Comparison 3 | — | yarn | — | cord |
| Comparison 4 | yarn | epoxy treated yarn | — | — |

TABLE 2

| | Embodiment | | | Comparison | | | |
|---|---|---|---|---|---|---|---|
| Run | 1 | 2 | 3 | 1 | 2 | 3 | 4 |
| adhesion | 110 | 110 | 110 | 100 | 100 | 80 | 95 |
| fatigue resistance | 100 | 105 | 100 | 100 | 95 | 90 | 90 |
| drawing life | 250 | 205 | 110 | 100 | 110 | 120 | 90 |
| tire durability | 145 | 130 | 110 | 100 | 105 | 100 | 105 |
| separation length | 25 | 65 | 70 | 100 | 95 | 95 | 80 |

The test items in Table 2 are conducted as follows. The values in the table are shown in the form of an index by setting the value of Comparison 1 to be 100. The higher index value means better performance. But the lower index value, the better performance with respect to the separation length.

*Adhesion

Drawing adhesion of cords was measured in accordance with a T-type drawing test (JIS L 1017 ref. 3.3.1 A method).

*Fatigue Resistance

Strength retention coefficient of cords before and after fatigue was evaluated by the Disc fatigue strength (JIS L-1017 ref. 3.2.2.2).

*Drawing Life

This is to evaluate a separation at the cut edge of cords. Evaluation was made by measuring the time until cords were drawn out from a rubber block by using a repeated extension fatigue testing machine.

*Tire Durability

Tests were conducted in accordance with FEDERAL MOTOR VEHICLE SAFETY STANDARDS, FMVSS1119 and the schedule of FMVSS119 succeeded, running of test drum was continued until the test tire causes trouble. Evaluation was made by measuring the time until test tire caused trouble at the inner pressure of 7.35 Kgf/cm and at the speed of 56 Km/h with the increase of load at a given lapse of time.

*Separation Length

Separation length from the turn-up end of the carcass was measured after disassembling test tires which caused trouble with the above tire durability test.

As apparent from Table 2, in the embodiment tires which employed a two-step treatment at the stage of both the yarn and the cord with the epoxy treating agent and the RFL treating agent, without regard to whether two kinds of treating agents were used respectively (Embodiment 1) or the epoxy treating agent was used to the yarn and the double treatment with the epoxy and RFL treating agents was conducted an the cord, adhesives penetrated well between the filaments so that excellent results were obtained in adhesion, fatigue resistance, drawing life, durability and separation length.

On the contrary, in Comparison tire 3 which is different from Embodiment 1 only in the number of treatments, tire performance was not good, from which one could understand that a double treatment with the epoxy and RFL treating agents is superior. In Comparison tire 4 wherein only the yarn was treated with the epoxy treating agent and the RFL treating agent and the cord was not treated with any treating agent, tire durability is poor. It is construed that the adhesives covering the rubber are too thin to relax shearing stress acting between the covering rubber and the cord and consequently dynamic fatigue becomes great.

A reduction of drawing life tends to increase with an increase of cord diameter. A treated cord A which was subjected to the two-step treatment conducted at the different stage of both the yarn and the cord in accordance with the present invention shows an much lower reduction of drawing life than a conventional cord which was merely treated at the stage of cord. Thus the effect of a double and two-step treatment is excellent.

A pneumatic radial tire employing the carcass cords which are obtained after the two-step treatment in accordance with the present invention is greatly improved in the cord inner adhesion so that a separation and a turn-up separation are restricted remarkably. As a result a reduction of tire weight can be effectively attained by reducing a ply number of carcass layer with the use of large diameter cords.

We claim:

1. A pneumatic radial tire for heavy vehicles including at least one ply of carcass layer comprising a number of cords disposed at right angles with respect to a circumferential direction of the tire, said cords of the carcass layer having a diameter greater than 0.8 mm and being formed by twisting at least two strands with a coefficient of twist of 1,000 to 2,000 which strands are each formed by twisting yarns comprising a number of filaments bundled together with a coefficient of twist of 600 to 1500, both said yarns and said cords being treated with both an epoxy treating agent and a RFL treating agent, and said coefficient of twist K being determined by the following equation.

$$K = T\sqrt{D/\rho}$$

wherein,

T is number of twists (turns/10 cm),
D is nominal denier and
$\rho$ is density (g/cm$^3$).

* * * * *